US008489721B1

(12) United States Patent
Gokhale et al.

(10) Patent No.: US 8,489,721 B1
(45) Date of Patent: Jul. 16, 2013

(54) METHOD AND APPARATUS FOR PROVIDING HIGH AVAILABILTY TO SERVICE GROUPS WITHIN A DATACENTER

(75) Inventors: Vrijendra Gokhale, Pune (IN); Manjiri Chitale, Pune (IN); Alok Ashok Sontakke, Pune (IN); Karthik Ramamurthy, Sunnyvale, CA (US); Sandeep Agarwal, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 719 days.

(21) Appl. No.: 12/346,401

(22) Filed: Dec. 30, 2008

(51) Int. Cl.
*G06F 15/16* (2006.01)
*G06F 15/173* (2006.01)

(52) U.S. Cl.
USPC .......... 709/223; 709/208; 709/209; 709/224; 709/226

(58) Field of Classification Search
None
See application file for complete search history.

(56) References Cited

U.S. PATENT DOCUMENTS

| | | | |
|---|---|---|---|
| 6,430,150 B1 * | 8/2002 | Azuma et al. ................. | 370/218 |
| 6,442,615 B1 * | 8/2002 | Nordenstam et al. ......... | 709/241 |
| 6,658,478 B1 * | 12/2003 | Singhal et al. ................ | 709/232 |
| 6,691,244 B1 * | 2/2004 | Kampe et al. ................. | 714/4.1 |
| 6,950,855 B2 * | 9/2005 | Sampathkumar ............. | 709/209 |
| 6,958,986 B2 * | 10/2005 | Cain ............................. | 370/337 |
| 7,127,637 B2 * | 10/2006 | Rathunde et al. ............. | 714/10 |
| 7,349,326 B1 * | 3/2008 | Zadikian et al. .............. | 370/216 |
| 7,386,585 B2 * | 6/2008 | Agrawal et al. ............... | 709/200 |
| 7,457,236 B2 * | 11/2008 | Cheng et al. .................. | 370/220 |
| 7,532,585 B2 * | 5/2009 | Kim et al. ..................... | 370/254 |
| 7,539,907 B1 * | 5/2009 | Johnsen et al. ............... | 714/47.2 |
| 7,561,526 B2 * | 7/2009 | Naden et al. .................. | 370/238 |
| 7,616,584 B2 * | 11/2009 | Katukam et al. .............. | 370/252 |
| 7,721,149 B2 * | 5/2010 | Essame et al. ................. | 714/11 |
| 7,774,642 B1 * | 8/2010 | Johnsen et al. ............... | 714/5.11 |
| 7,894,372 B2 * | 2/2011 | Chu et al. ...................... | 370/255 |
| 2003/0135609 A1 * | 7/2003 | Carlson et al. ................ | 709/224 |
| 2005/0013310 A1 * | 1/2005 | Banker et al. ................. | 370/401 |
| 2005/0060432 A1 * | 3/2005 | Husain et al. ................. | 709/246 |
| 2006/0080417 A1 * | 4/2006 | Boutboul et al. ............. | 709/220 |
| 2006/0198308 A1 * | 9/2006 | Vasseur et al. ................ | 370/238 |
| 2007/0038767 A1 * | 2/2007 | Miles et al. ................... | 709/230 |
| 2007/0168336 A1 * | 7/2007 | Ransil et al. .................. | 707/3 |
| 2007/0299950 A1 * | 12/2007 | Kulkarni ....................... | 709/223 |
| 2008/0263390 A1 * | 10/2008 | Baba et al. .................... | 714/4 |
| 2008/0270644 A1 * | 10/2008 | Rooney et al. ................ | 710/38 |
| 2010/0088412 A1 * | 4/2010 | Deval et al. ................... | 709/226 |
| 2010/0118711 A1 * | 5/2010 | Cankaya et al. .............. | 370/248 |
| 2010/0142409 A1 * | 6/2010 | Fallon et al. .................. | 370/255 |
| 2010/0153481 A1 * | 6/2010 | Ginkel et al. ................. | 709/201 |

\* cited by examiner

*Primary Examiner* — Thu Nguyen
*Assistant Examiner* — Angela Widhalm
(74) *Attorney, Agent, or Firm* — Campbell Stephenson LLP

(57) ABSTRACT

A method and apparatus for providing high availability to service groups within a datacenter is described. In one embodiment, the method includes accessing policy master information regarding a plurality of nodes to identify at least one suitable node of the plurality of nodes for operating a service group, generating network topology information to identify at least one single point of failure amongst the plurality of nodes, processing high availability information regarding at least one computer resource at the at least one suitable node and determining availability indicia of the service group based upon the network topology information and the high availability information.

20 Claims, 4 Drawing Sheets

METHOD AND APPARATUS FOR PROVIDING HIGH AVAILABILTY TO SERVICE GROUPS WITHIN A DATACENTER

BACKGROUND OF THE INVENTION

1. Field of the Invention

Embodiments of the present invention generally relate to a cluster management and, more particularly, to a method and apparatus for providing high availability to service groups using robust nodes.

2. Description of the Related Art

In a typical computing environment, an organization may employ a number of technologies to process, store, protect, recover, produce and/or secure mission critical data. For example, the organization may employ one or more virtualization techniques to create one or more abstract computer resources (e.g., virtual machines, virtual applications, virtual desktops, virtual hardware devices and/or the like) from physical computer resources. Moreover, the typical computing environment may include one or more nodes (e.g., computer systems) that provide application services to one or more client computers. For example, a datacenter (i.e., a cluster) may include several physical machines and/or virtual machines that manage one or more database systems (e.g., ORACLE Databases).

Datacenter application services are normally distributed and interdependent. In order to ensure high availability of such application services, the datacenter configures one or more nodes to be redundant systems. When a current system fails, the application services are restarted on a target redundant system. As such, the failover process may be seamless or require a minimal of amount of downtime. A client producing mission critical data using the applications services may not even notice that current system failed. Accordingly, the datacenter allocates various computer resources (e.g., memory, processor cycles and/or the like) at the redundant system to running the application.

Current high availability solutions (e.g., VERTIAS Cluster Server One) and related components (e.g., Policy Master, Agents and/or the like) utilize various target selection algorithms neither of which identify and/or report single points of failure (SPOFs) within a computer network. In other words, the current high availability solutions for datacenters are limited to a perspective that the computer network is a black box. Furthermore, the various target selection algorithms are unable to distinguish between a particular redundant system that is behind a single point of failure and an identical redundant system that is more robust and devoid of SPOFs. Selecting the particular redundant system behind the single point of failure renders client computers vulnerable to failures. Consequently, a failure within the redundant system leads to downtime and a loss in productivity for an organization.

Therefore, there is a need in the art for a method and apparatus for providing high availability to service groups within a datacenter.

SUMMARY OF THE INVENTION

Embodiments of the present invention generally include a method and apparatus for providing high availability to service groups within a datacenter. In one embodiment, the method includes accessing policy master information regarding a plurality of nodes to identify at least one suitable node of the plurality of nodes for operating a service group, generating network topology information to identify at least one single point of failure amongst the plurality of nodes, processing high availability information regarding at least one computer resource at the at least one suitable node and determining availability indicia of the service group based upon the network topology information and the high availability information.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
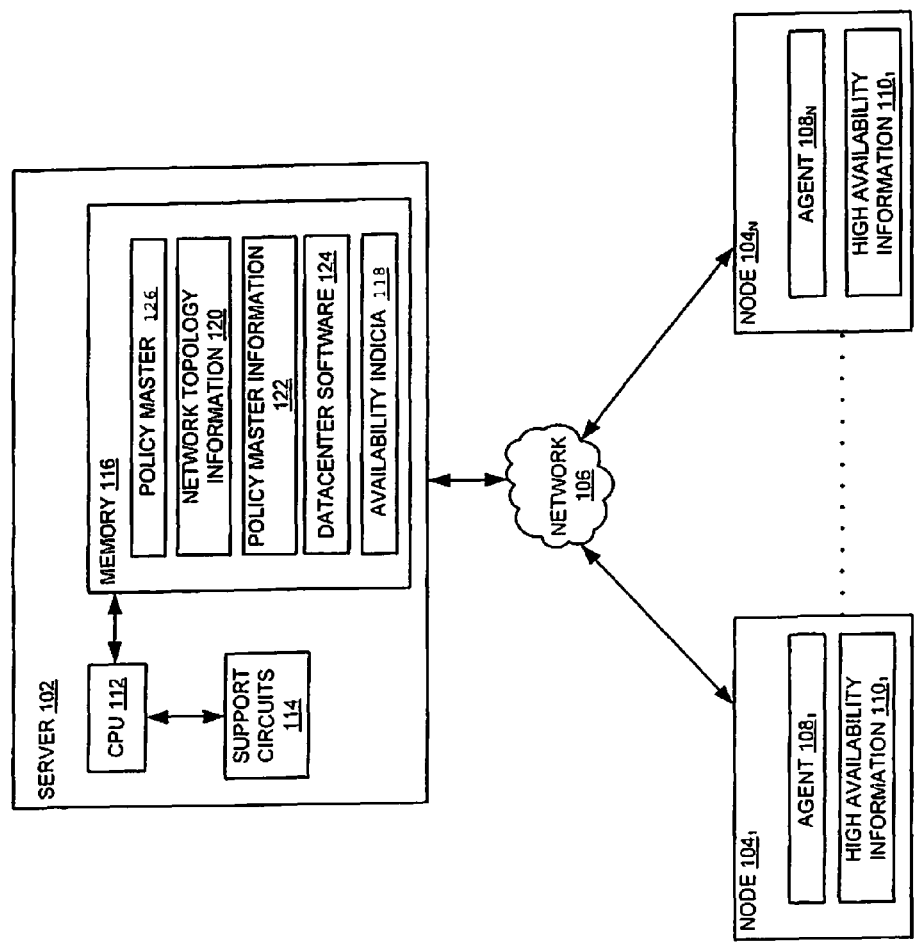
FIG. 1 is a block diagram of a system for providing high availability to service groups according to various embodiments.

FIG. 1 is a block diagram of a system 100 for providing high availability to service groups according to various embodiments. In one embodiment, the system 100 includes a server 102 and a plurality of nodes 104 where each is coupled to each other through a network 106.

The server 102 is a type of computing device (e.g., a laptop, a desktop, a Personal Desk Assistant (PDA), a tablet, a mobile phone and the like) that comprises a central processing unit (CPU) 112, various support circuits 114 and a memory 116. The CPU 112 may comprise one or more commercially available microprocessors or microcontrollers that facilitate data processing and storage. Various support circuits 114 facilitate operation of the CPU 112 and may include clock circuits, buses, power supplies, input/output circuits and/or the like. The memory 116 includes a read only memory, random access memory, disk drive storage, optical storage, removable storage, and the like. The memory 116 includes various data, such as availability indicia 118, network topology information 120 and policy master information 122. The memory 116 includes various software packages, such as datacenter software 124 and a policy master 126.

The plurality of nodes 104 are computing devices that include various computer resources, which are configured to operate service groups within the datacenter according to one or more embodiments. The plurality of nodes 104 may include one or more nodes having different capacities of the various computer resources (e.g., processors, networking components, computer memory and/or the like). For example, a particular node may include fifteen gigabytes of hard disk storage space and another node may include twenty gigabytes of hard disk storage space. Accordingly, the particular node is less robust and the another node should be selected by the policy master 126. On the other hand, the another node may be behind a networking device (e.g., a router) that is a single point of failure. As such, the policy master 126 may determine that the another node is less robust than the particular node due to the single point of failure as explained below. Alternatively, the policy master 126 may determine that the another node is more robust notwithstanding the single point of failure as explained below.

The network 106 comprises a communication system that connects computers by wire, cable, fiber optic, and/or wireless links facilitated by various types of well-known network elements, such as hubs, switches, routers, and the like. The network 106 may employ various well-known protocols to communicate information amongst the network resources. For example, the network 106 may be part of the Internet or intranet using various communications infrastructure such as Ethernet, WiFi, WiMax, General Packet Radio Service (GPRS), and the like. Furthermore, the network 106 may form a portion of a Storage Network Area (SAN) using various communications infrastructure such as Ethernet, Fibre Channel, InfiniBand, and the like.

In one embodiment, the plurality of nodes 104 further includes a plurality of agents 108 that communicate high availability information 110 regarding computer resources configured for use by a service group. Furthermore, the plurality of agents 108 monitors a state of the service group because a particular node cannot host the service group if an agent within the particular node has faulted or is unregistered. The plurality of agents 108 may form a portion of agent framework associated with the datacenter software 124. In one embodiment, each agent of the plurality of agents 108 communicates a high availability index for each resource of the various computer resources. The high availability index represents a perspective by the agent of the plurality of agents 108 of a high availability readiness for the particular resource.

Generally, a high availability index indicates a likelihood of a failure (i.e., robustness) of a particular resource that is configured for high availability. For example, a high availability index of a volume with two mirrors will be higher than a simple concat volume. As another example, a high availability index of a shared storage resource (i.e., Logical Unit Number (LUN)) with redundant connections will be higher than a LUN with a single connection. The high availability index is determined in accordance with metric that defines robustness values for a certain resource, service group and/or node. For example, the high availability index for a particular resource may be a robustness value between zero and one that represents the high availability readiness of the particular resource.

As explained further below, a service group (e.g., a VERITAS CLUSTER SERVER (VCS) service group) generally includes one or more hardware and/or software resources at one or more nodes of the plurality of nodes 104. The service group may be used to facilitate access to the various computer resources (e.g., critical application services hosted by a datacenter) for the server 102. In one embodiment, the service group enables control over one or more of the hardware resources (e.g., a network resource, such as a network interface card) and software resources (e.g., a process, such as a web application process) associated with operating one or more application services as a single unit. In one embodiment, the service group includes one or more mounted volumes for operating the application services.

The service group may be used by the server 102 to manage the application services. In order to achieve high availability for the service group, the application services are failed over a different node of the plurality of nodes 104 (i.e., a node that is the most robust amongst suitable nodes). Upon an occurrence of a failure, the one or more hardware and/or software resources are stopped and the service group is migrated (i.e., restarted) on the different node according to one embodiment.

According to various embodiments, the availability indicia 118 includes a high availability index of a particular service group. A higher value for the high availability index indicates that one or more suitable nodes of the plurality of nodes 104 are better distributed within the datacenter. Such a high availability index may be computed from one or more high availability indexes associated with the one or more suitable nodes (i.e., systems) of the plurality of nodes 104 that are able to host the particular service group.

According to various embodiments, the network topology information 120 represents a distribution of network devices and the plurality of nodes 104. In one embodiment, the network topology information 120 defines a plurality of routes between the server 102 and the plurality of nodes 104. Based on the network topology information 124, one or more single points of failures may be identified. In addition, an image may be generated to represent the network topology information 120 and presented on a computer display at the server 102. As a result, a system administrator may view the image in order to examine the distribution of the network devices within a datacenter. Furthermore, the network topology information 120 may include one or more Extensible Markup Language (XML) files that are stored in a database. The one or more XML files may be communicated to a graphical user interface (GUI) (e.g., VCSOne GUI) to be displayed to the system administrator.

In one embodiment, the network topology information 120 may be generated using a traceroute command from the policy master 126. Furthermore, the policy master 126 may instruct each node of the plurality of nodes 104 to issue a traceroute command to each other node in order to generate a layer-3 network topology of the datacenter. In another embodiment, the network topology information 120 may be generated using Simple Network Management Protocol (SNMP) queries to access routing information from each router within the network 106. The routing information is parsed to determine a route from the server 102 and each node of the plurality of nodes 104. Hence, the network topology information 120 may be used to differentiate between a node failure and a network connectivity loss.

The policy master information 122 may be used to identify one or more suitable as well as one or more unsuitable nodes of the plurality of the nodes 104 for operating a service group (i.e., non-availability). In other words, the service group cannot failover to the one or more unsuitable nodes of the plurality of the nodes 104 due to one or more factors, such as node frozen (e.g., by the policy master 126), node unavailability, child service group unavailability and/or resource unavailability (e.g., child service group resource unavailability). For example, a particular node is frozen when the particular node is in maintenance mode. As another example, one or more network shared volumes may be unavailable or invisible. In addition, the service group may have previously faulted on the one or more unsuitable nodes of the plurality of the nodes 104.

Moreover, the service group may be auto-disabled, not enabled and/or planned for offline on the one or more nodes of the plurality of the nodes 104. Furthermore, a corresponding agent of the service group may be failed and/or unregistered on the one or more nodes of the plurality of the nodes 104. The service group may already include a faulted resource and/or a resource in an unknown state. Also, the one or more nodes of the plurality of the nodes 104 may be hosting higher priority, incompatible service groups. Additionally, the one or more unsuitable nodes may not be able to communicate with the server 102 after a network partitioning process within the datacenter.

Generally, the datacenter software 124 (e.g., SYMANTEC VCSOne) provides various application services to a computing environment. In one embodiment, the datacenter software 124 includes software code that is executed to manage a plurality of service groups across the plurality of nodes 104. To provide high availability for a particular service group, the datacenter software 124 configures one or more suitable nodes of the plurality of nodes 104 to be one or more redundant systems. In response to a failure, the datacenter software 124 selects a robust target node for hosting the service group amongst the plurality of nodes and fails over the particular service group to a node of the one or more nodes of the plurality of nodes 104. According to one or more embodiments, the datacenter software 124 and the policy master 126 cooperate to provide high availability to the plurality of service groups using the network topology information 120 and the policy master information 122.

The policy master 126 and the plurality of agents 108 cooperate to create the policy master information 122. In one embodiment, the policy master 126 and the plurality of agents 108 are continuously monitoring redundant systems and service groups within the datacenter in order generate the policy master information 122. Based on the policy master information 122, the policy master 126 identifies one or more suitable nodes of the plurality of nodes 104. Furthermore, the policy master 126 generates the network topology information 120, as described above. In one embodiment, the policy master 126 examines the network topology information 120 to identify one or more single points of failure (SPOFs) amongst the plurality of nodes 104.

In one embodiment, the policy master 126 determines the availability indicia 118 of a service group based upon the network topology information 120 and the high availability information 110. As explained above, the plurality of agents 108 communicate the high availability information 110 to the server 102, which includes one or more high availability indexes for one or more computer resources. In operation, the policy master 126 computes a high availability index of the service group for each suitable node of the plurality of nodes 104. Then, the policy master 126 computes a high availability index of the service group using the computed high availability indexes of the service group for the suitable nodes amongst the plurality of nodes 104

Figure 2:
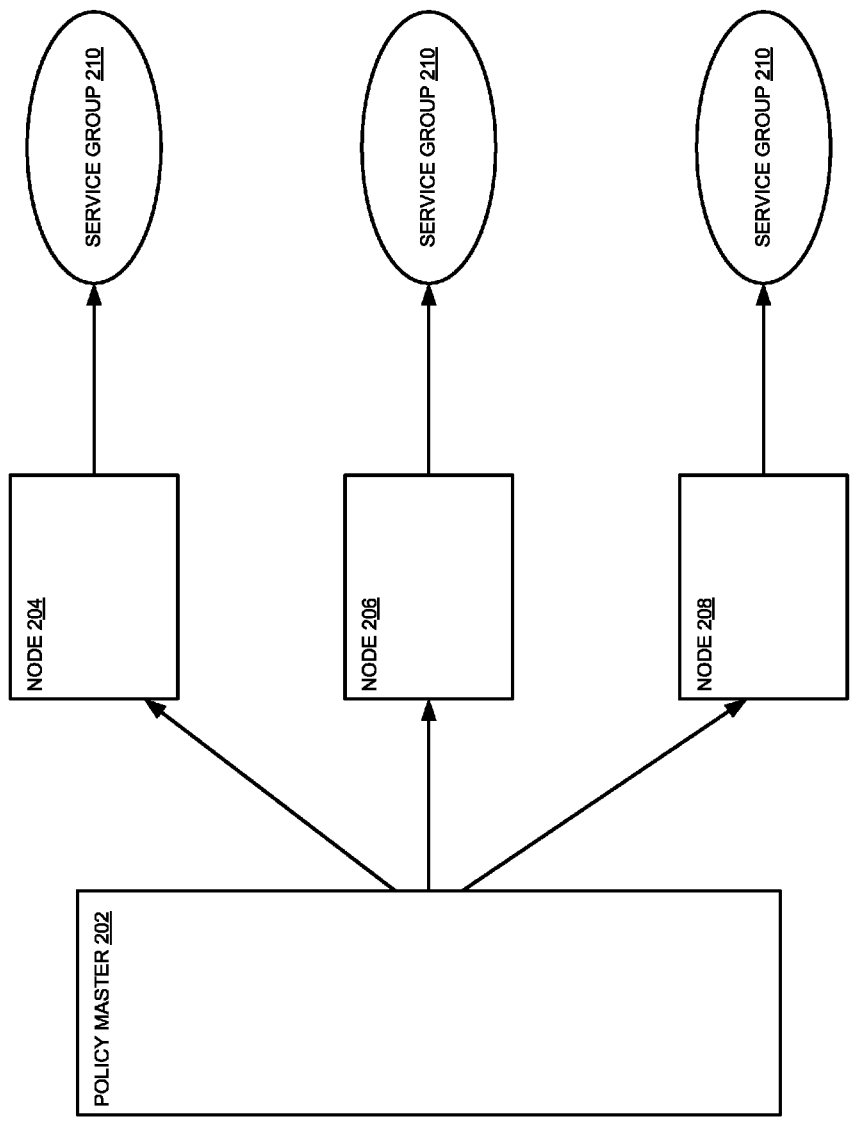
FIG. 2 is a functional block diagram that illustrates a datacenter architecture, in which a policy master provides high availability to service groups according to various embodiments.

FIG. 2 is a functional block diagram that illustrates datacenter architecture 200, in which a policy master 202 provides high availability to service groups according to various embodiments. The policy master 202 is coupled with a node 204, a node 206 and a node 208, each of which is suitable for operating (i.e., hosting) a service group 210 based on policy master information as described above. As such the service group 210 is configured on the node 202, node 204 and the node 206.

In one embodiment, the service group 210 is currently online at the node 204 and offline at the node 206 and the node 208. Hence, the node 206 and the node 208 are redundant systems for the service group 210. As mentioned herein, the policy master 202 processes one or more high availability indexes for one or more critical computer resources at each of the node 204, the node 206 and the node 208. The one or more critical resources may be configured for use by the service group 210 according to one embodiment. Accordingly, the policy master 202 computes availability indicia for the service group 210 to determine whether a failure at the node 204 may cause downtime. In other words, the policy master 202 determines that service group 210 can be failed over to the node 206 or the node 208 according to one embodiment.

In one embodiment, the policy master 202 computes a high availability index of the service group 210 for each of the node 202, the node 204 and the node 206. For example, the high availability index of the service group 210 for a particular node may be equal to a minimum high availability index amongst each and every critical resource, which is multiplied by a SPOF factor. For example, the SPOF factor is one (1) if the particular node is redundantly connected to the policy master 202. Otherwise, the SPOF factor is 0.5. Then, the availability indicia of the service group 210 is a sum of the high availability indexes of the service group 210 for the node 202, the node 204 and the node 206, which is divided by a number of suitable nodes for hosting the service group 210 (i.e., three). The policy master 202 continuously monitors the availability indicia to provide high availability to the service group 210.

For example, the minimum high availability indexes for all of the critical resources at the node 202, the node 204 and the node 206 are 0.6, 0.7 and 0.9, respectively. Furthermore, the node 206 is behind a single point of failure. As such, a SPOF factor for the node 206 is 0.5, whereas the SPOF factor for the node 204 and the node 208 is 1. Hence, the high availability indexes for the service group 210 at the node 204 and the node 208 are 0.6 and 0.9, respectively. On the other hand, the high availability index for the service group 210 at the node 206 is 0.7 multiplied by 0.5, which equals 0.35. The availability indicia for the service group 210 is computed from a sum of 0.6, 0.9 and 0.35, which is divided by three. As a result, the availability indicia of the service group is computed to be 0.6167. If the availability indicia is too low as defined by a configurable threshold, the policy master 202 communicates an alert to a system administrator.

Figure 3:
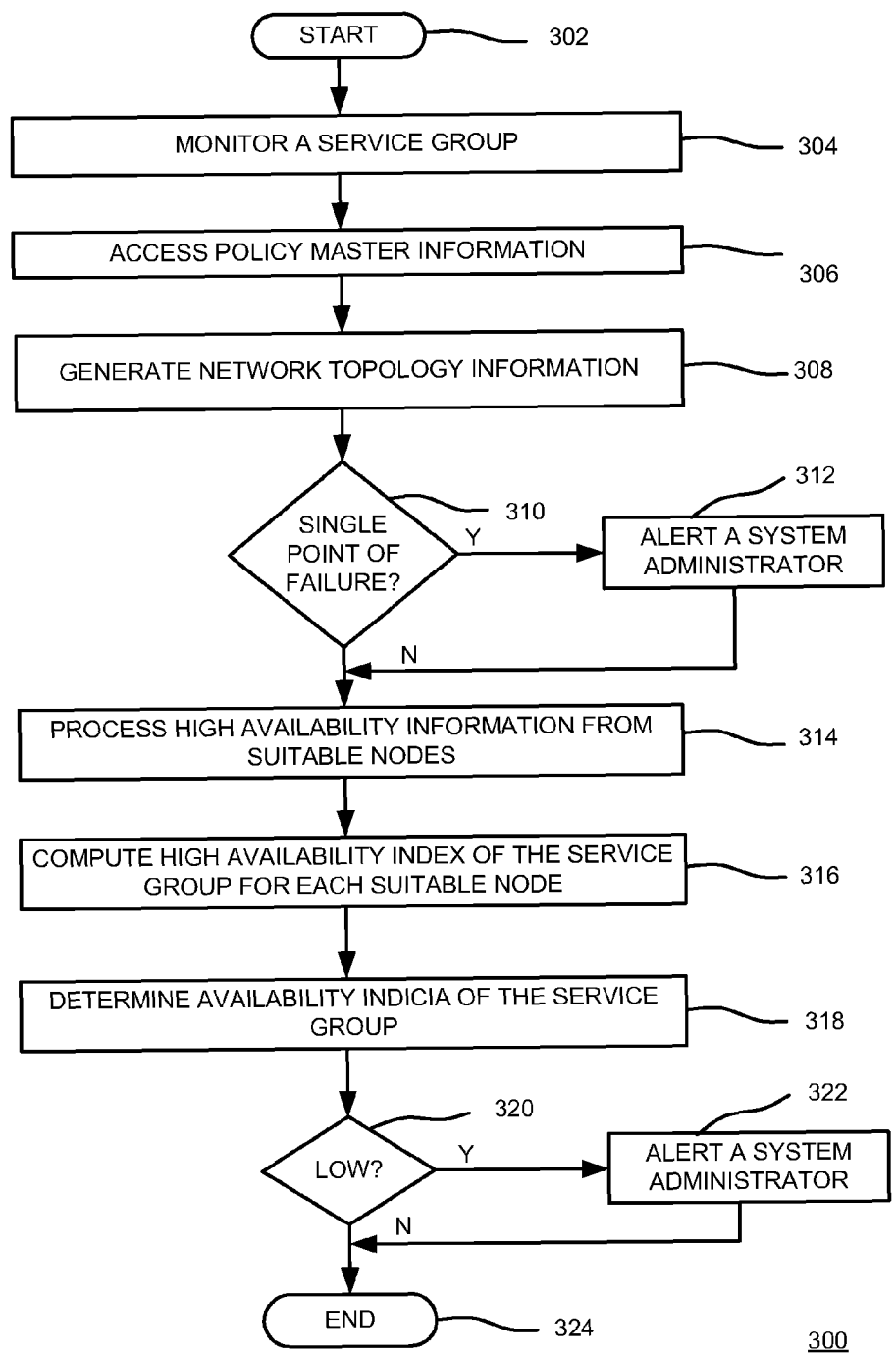
FIG. 3 is a flow diagram of a method for generating availability indicia for service groups within a datacenter according to various embodiments.

FIG. 3 is a flow diagram of a method 300 for generating availability indicia for service groups within a datacenter according to various embodiments. In one embodiment, the method 300 starts at step 302 and proceeds to step 304.

At step 304, a service group (e.g., the service group 210 of FIG. 2) is monitored. At step 306, policy master information (e.g., the policy master information 122 of FIG. 1) is accessed. In one embodiment, the policy master information indicates one or more suitable nodes for operating the service group. At step 308, network topology information (e.g., the network topology information 120 of FIG. 1) is generated. At step 310, a determination is made as to whether there is a single point of failure associated with the one or more suitable nodes. If there is a single point of failure, then the method 300 proceeds to step 312. At step 312, a system administrator is alerted. If there is no single point of failure, then the method 300 proceeds to step 314.

At step 314, high availability information from the one or more suitable nodes is processed. At step 316, a high availability index of the service group is computed for each of the one or more suitable nodes. At step 318, availability indicia is determined for the service group. At step 320, a determination is made as to whether the availability indicia is low when compared with a configurable threshold. If the availability indicia is determined to be low (e.g., falls below the configurable threshold), then the method 300 proceeds to step 322. At step 322, the system administrator is alerted. If the availability indicia is determined to be not low (e.g., does not fall below the configurable threshold), then the method 300 proceeds to step 324. At step 324, the method 300 ends.

Figure 4:
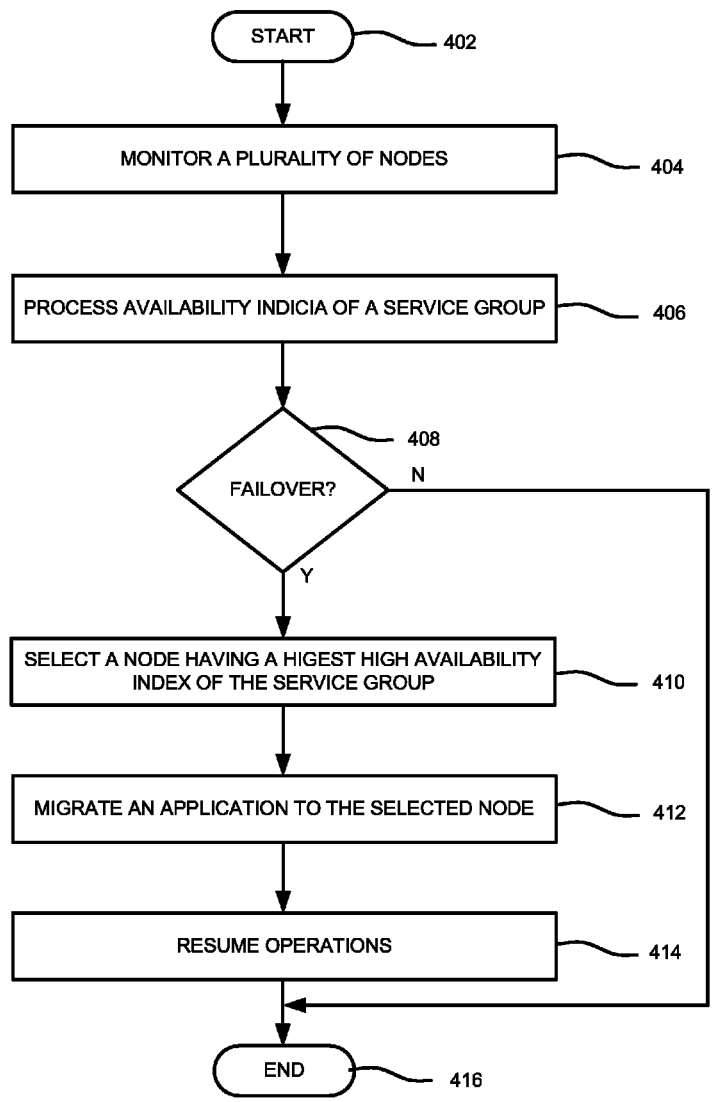
FIG. 4 is a flow diagram of a method for providing high availability to service groups within a datacenter according to various embodiments.

FIG. 4 is a flow diagram of a method 400 for providing high availability to service groups within a datacenter according to various embodiments. In one embodiment, the method 400 starts at step 402 and proceeds to step 404.

At step 404, a plurality of nodes are monitored. At step 406, availability indicia for a service group is processed. As the plurality of nodes are monitored, the availability indicia is continuously updated. At step 408, a determination is made as to whether there is to be a failover of the service group to a suitable node for operating the service group. For example, a failure within the datacenter may cause a failover of the service group. If the service group is to be failed over, then the method 400 proceeds to step 410. If the service group is not to be failed over, the method 400 proceeds to step 416. At step 410, a suitable node is selected having a highest high availability index for the service group. At step 412, the service group is migrated to the selected node. At step 414, operations of the service group are resumed at the selected node. At step 416, the method 400 ends.

While the foregoing is directed to embodiments of the present invention, other and further embodiments of the invention may be devised without departing from the basic scope thereof, and the scope thereof is determined by the claims that follow.

The invention claimed is:

1. A method comprising:
    identifying at least one suitable node for operating a service group by accessing policy master information, wherein the policy master information indicates the at least one suitable node of a plurality of nodes
    identifying whether each of the at least one suitable node comprises a single point of failure by analyzing network topology information;
    processing high availability information for the each of the at least one suitable node, wherein
        the high availability information is received from the each of the at least one suitable node, and
        the high availability information relates to at least one computer resource at the each of the at least one suitable node that is configured for use by the service group;
    determining a high availability index for the each of the at least one suitable node, wherein
        the high availability index for the each of the at least one suitable node is determined from a high availability index of the at least one computer resource at the each of the at least one suitable node; and
    computing a high availability index for the service group, wherein
        the high availability index for the service group is computed using the network topology information and the high availability index for the each of the at least one suitable node.

2. The method of claim 1, wherein the accessing the policy master information further comprises:
    identifying at least one unsuitable node of the plurality of nodes for operating the service group by accessing the policy master information.

3. The method of claim 1, further comprising:
    determining at least one of network connectivity failure or a node failure based on the network topology information.

4. The method of claim 1, further comprising:
    generating a representation of the network topology information for presentation on a computer display.

5. The method of claim 1, further comprising:
    generating the network topology information by examining a plurality of routes between a server and the plurality of nodes to identify at least one network device.

6. The method of claim 1, further comprising:
    generating the network topology information by parsing routing information from at least one network device to determine a plurality of routes between a server and the plurality of nodes.

7. The method of claim 1, further comprising:
    generating the network topology information by identifying at least one node of the plurality of nodes that is behind the at least one single point of failure.

8. The method of claim 1, further comprising:
    in response to a failure at a first node of the plurality of nodes,
        selecting a second node having a highest high availability index, wherein
            the selecting is performed based on the high availability index for the each of the at least one suitable node, and
        restarting the service group on the second node.

9. The method of claim 1, further comprising:
    alerting a system administrator if a high availability index for at least one node of the plurality nodes falls below a configurable threshold.

10. The method of claim 1, wherein the high availability index of the at least one computer resource at the each of the at least one suitable node indicates a likelihood of a failure of the at least one computer resource.

11. The method of claim 1, wherein the high availability index for the service group is computed according to metrics for defining the robustness values for the each of the at least one suitable node.

12. A non-transitory computer readable storage medium comprising program instructions executable to:
    identify at least one suitable node for operating a service group by accessing policy master information, wherein the policy master information indicates the at least one suitable node of a plurality of nodes;
    determine whether each of the at least one suitable node comprises a single point of failure by analyzing network topology information;
    process high availability information for the each of the at least one suitable node, wherein
        the high availability information is received from the each of the at least one suitable node, and
        the high availability information relates to at least one computer resource at the each of the at least one suitable node that is configured for use by the service group;
    determine a high availability index for the each of the at least one suitable node, wherein
        the high availability index for the each of the at least one suitable node is determined from a high availability index of the at least one computer resource at the each of the at least one suitable node; and
    compute a high availability index for the service group, wherein
        the high availability index for the service group is computed using the network topology information and the high availability index for the each of the at least one suitable node.

13. The computer readable storage medium of claim 12, wherein the program instructions are further executable to:
    identify at least one unsuitable node of the plurality of nodes for the service group by accessing the policy master information.

14. The computer readable storage medium of claim 12, wherein the program instructions are further executable to:

generate the network topology information by examining the network topology information to identify at least one node of the plurality of nodes that is behind the at least one single point of failure.

15. The computer readable storage medium of claim 12, wherein the program instructions are further executable to:
select a first node having a highest high availability index amongst each of the at least one suitable node in response to a failure at a second node of the plurality of nodes, wherein
the service group is restarted on the first node.

16. The computer readable storage medium of claim 11, wherein the program instructions are further executable to:
communicate an alert message if a high availability index for at least one node of the plurality of nodes falls below a configurable threshold.

17. A system comprising:
one or more processors;
memory coupled to the one or more processors, wherein the memory stores program instructions executable by the one or more processors to:
identify at least one suitable node for operating a service group by accessing policy master information, wherein the policy master information indicates the at least one suitable node of a plurality of nodes;
determine whether each of the at least one suitable node comprises a single point of failure by analyzing network topology information;
process high availability information for the each of the at least one suitable node, wherein
the high availability information is received from the each of the at least one suitable node, and
the high availability information relates to at least one computer resource at the each of the at least one suitable node that is configured for use by the service group;
determine a high availability index for the each of the at least one suitable node, wherein
the high availability index for the each of the at least one suitable node is determined from a high availability index of the at least one computer resource at the each of the at least one suitable node; and
compute a high availability index for the service group, wherein
the high availability index for the service group is computed using the network topology information and the high availability index for the each of the at least one suitable node.

18. The system of claim 17, wherein the program instructions are further executable to:
select a first node having a highest high availability index amongst the each of the at least one suitable node in response to a failure at a second node of the plurality of nodes, wherein
the service group is restarted on the first node.

19. The system of claim 17, wherein the program instructions are further executable to:
communicate an alert message if a high availability index for at least one node of the plurality of nodes falls below a configurable threshold.

20. The system of claim 17, wherein the program instructions are further executable to:
generate an image that represents the network topology information for presentation on a computer display.

* * * * *